United States Patent [19]

Wang et al.

[11] Patent Number: 5,457,477

[45] Date of Patent: Oct. 10, 1995

[54] IMAGE DATA PROCESSING SYSTEM WITH FALSE COLOR SUPPRESSION SIGNAL GENERATOR UTILIZING LUMINANCE AND EDGE THRESHOLD SUPPRESSION METHODS

[75] Inventors: Jen-Chuan Wang; Der-Song Su; Den-Jen Hwang, all of Hsinchu, Taiwan, Prov. of China

[73] Assignee: Industrial Technology Research Institute, Hsinchu, Taiwan, Prov. of China

[21] Appl. No.: 191,032

[22] Filed: Feb. 2, 1994

[51] Int. Cl.⁶ ............................................. G09G 3/00
[52] U.S. Cl. ........................... 345/150; 345/153; 348/645
[58] Field of Search ........................ 345/150, 153; 348/645, 646–648, 703, 712, 242, 272

[56] References Cited

U.S. PATENT DOCUMENTS

| | | |
|---|---|---|
| 4,480,266 | 10/1984 | Hashimoto. |
| 4,754,323 | 6/1988 | Kaji et al. |
| 4,974,066 | 11/1990 | Tusji ........................ 348/242 |

*Primary Examiner*—Ulysses Weldon
*Attorney, Agent, or Firm*—Bo-In Lin

[57] ABSTRACT

An image data processing system is disclosed which includes an image data receiving element, e.g., a CCD module, for receiving and converting a plurality of image data into electrical signals. The image data processing system further includes a color processing subsystem which includes the color separation unit, the RGB generation unit, the white balance control unit, the gamma correction unit, and the color space converter, for processing the electrical signals for generating color display output representing the color space of the image data. The image data processing system further includes a luminance processing units which includes two 1-H line memory units, the low pass filter, the edge enhancement unit, the summing circuit and the gamma correction unit, for filtering and processing the electrical signals for generating luminance output representing the luminance field of the image data. The luminance processing unit further including a false color suppression signal generating unit for generating a false color suppression signal by using a brightness threshold unit and an edge threshold unit which employs a high edge threshold and low edge threshold. The luminance processing unit further provides the false color suppression signal to the color processing unit, e.g. to the color space converter, for suppressing the display of the false color.

10 Claims, 12 Drawing Sheets

Figure 5A  The frequency analysis of horizontal edge

Figure 5B

The frequency analysis of vertical edge

The low-pass filter for false color suppression signal generator 3-bit counter

Figure 10

$o3 = \overline{i3}\ i2\ \overline{i1}\ \overline{i0}$ $o2 = \overline{i3}\ i2\ \overline{i1}\ \overline{i0} + \overline{i3}\ i2\ i1\ i0$ $o1 = \overline{i3}\ i2\ \overline{i1}\ \overline{i0} + \overline{i3}\ i2\ i1$ $o0 = \overline{i3}\ i2\ i1\ \overline{i0} + \overline{i3}\ i2\ i1 + \overline{i3}\ i2\ i0$ Random logic and delays

Figure 11

IMAGE DATA PROCESSING SYSTEM WITH FALSE COLOR SUPPRESSION SIGNAL GENERATOR UTILIZING LUMINANCE AND EDGE THRESHOLD SUPPRESSION METHODS

BACKGROUND OF THE INVENTION

1. Field of the Invention

This invention relates generally to image data processing and display. More particularly, this invention relates to an apparatus and method for image data processing to accurately suppress the false color phenomena caused by different color saturation speed of image sensing elements due to the high intensity of the incident light.

2. Description of the Prior Art

As the techniques of image sensing and graphic display, aided by recent advancements made in electronics and data processing, are achieving great progresses, there are still technical difficulties in attempt to overcome the problems of false color phenomena. A false color signal is generated in a single-plate type of color imaging devices when the incident light has a high intensity. The false color phenomena is caused by the fact that the sensing elements are saturated at different incident light intensities due to the difference in the transmittance of the color filters provided in the imaging system. The false color can be generated where the incident light has high intensity or along the edges where there is a cross over between the bright and dark image zones. This problem not only causes the displayed image to appears in false colors, the image shapes may be distorted if the false colors are shown over an extended area on the screen. Therefore, in order to improve the image quality, the display of the false colors must be suppressed when the intensity of the image signals becomes too high.

A method was proposed in order to overcome this problem by selecting the transmission characteristics of the color filter in a manner such that the quantities of saturation light of the light sensing elements corresponding to each of the red (R), green (G) and cyan (Cy) color filters are identical. However because the quantity of the saturation light of each radiation sensing element changes with a change in color temperature which causes the determination of a correct saturation light quantity not achievable. Theoretically, this difficulty can be resolved by making use of a color temperature correction or compensation circuit for each color filter, however, such design and implementation will cause the image sensing and display device to become very complicate and expensive.

To solve this problem, an alterative method is used by first detecting the occurrence of a saturation output signal and then suppressing a color carrier signal. This often requires that the video signals must be first encoded in a NTSC format such that the color carrier signals can be separately processed. The application of this technique is therefore limited that it cannot be applied to the pre-recorded data stored in a magnetic recording circuit which has not been first processed by an NTSC encoder. Additional difficulties may also arise if the color suppression is performed at a color subcarrier stage. An over-suppression may often occur because the low-pass filter in a color separation unit often broaden the color signal over the time range. A range of the color signal to be suppressed will have been widened in the direction of time which may cause an error color signal to be generated due to this broadening effect.

In order to overcome the above technical difficulties, Kaji et al. discloses in U.S. Pat. No. 4,754,323 entitled "Color Image Pickup Device in Which the Level of A Sequential Color-Difference Signal is Controlled on the Basis of the Level of the Luminance Signal" (Issued on Jun. 28, 1988), a color image pickup device. The color pickup image device includes an image sensor combined with a color separation filter; a detector for detecting a brightness level of an object; a color signal forming circuit for forming a color signal from an output of the image sensor; a sequence circuit for sequencing the color signals; a controller for controlling the output of the sequence circuit responsive to the output of the brightness detector; and a modulator for modulating the output of the controller. The false color suppression circuit utilizes a low-pass filter and a high brightness detector for detecting the brightness of the image data and then comparing the brightness to a threshold saturation level. The false color suppression circuit sends a control signal to a variable gain amplifier to suppress the detected false color when the saturation threshold level is exceeded.

Figure 1:
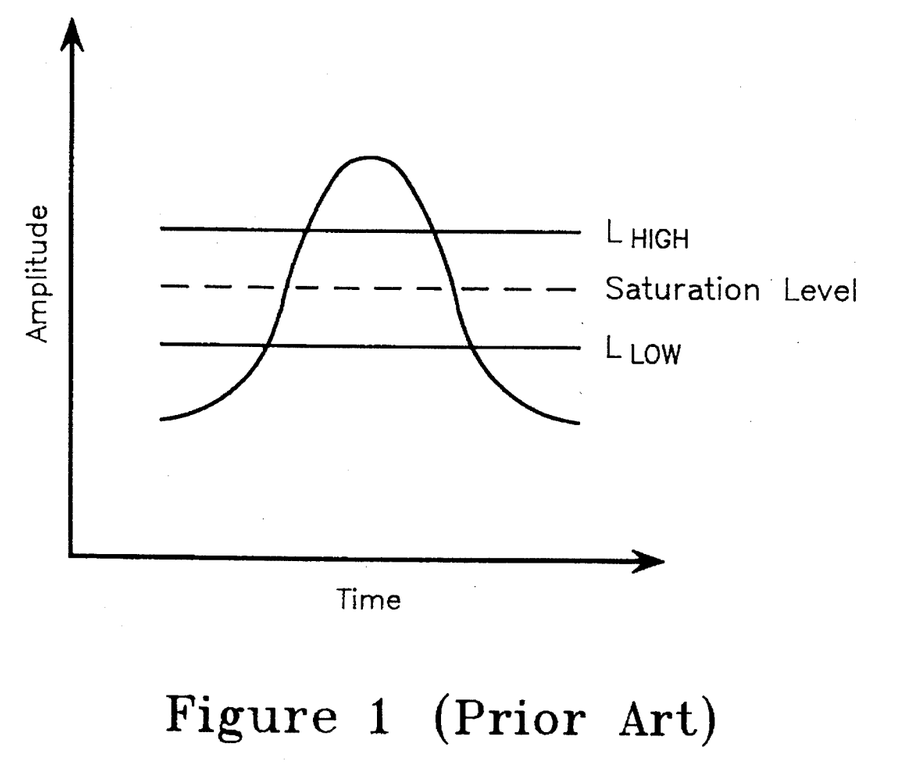
FIG. 1 is a timing diagram of an image signal wherein different levels of thresholds are applied in the prior art for the purpose of false color suppression.

The technique of cancelling the false color signal generated in the high intensity component by detecting the in-phase luminance signal as disclosed by Kaji et al. may still encounter the difficulties that the false color on the periphery is left uncanceled. There are several factors which may cause this error to occur. There are differences in frequency characteristics and slight phase-difference between the luminance and color signals. A flare image may also prevent the color suppression technique to function properly. Referring to FIG. 1 wherein the intensity of a signal is shown as function of time. Generally, there is a rising portion and a falling portion of the signal. On both sides, the rising and the falling edges, the color cancellation is insufficient, e.g., when a threshold of $L_{high}$ is used in FIG. 1, due to the above mentioned technical limitations. For the purpose of widening the length of the false color suppression range, in one of the preferred embodiments, Kaji et al. employ a low pass filter in the process of color separation. This will extend the color suppression to both sides of the periphery in the color cancelling portion, however, in the contrary, this may cause over-suppression (See FIG. 1 where $L_{low}$ is applied) if the widening of the time range is not managed properly.

Figure 2A:
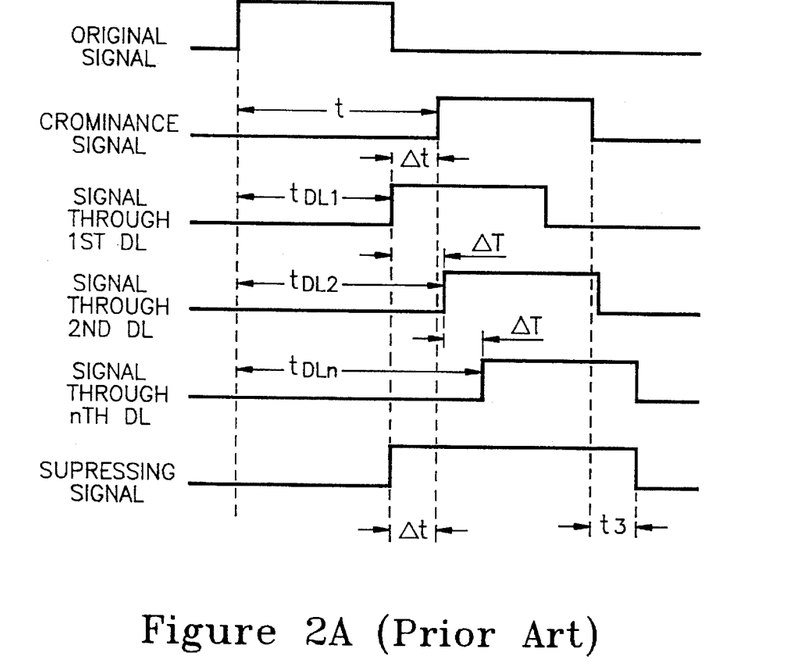
FIGS. 2A and 2B are timing diagrams showing various time delays for the purpose of achieving false color suppression employed by the prior art techniques.

Various techniques of utilizing delay circuits are proposed to resolve these problems. Tusji discloses in U.S. Pat. No. 4,974,066 entitled "Circuit for Preventing High-Intensity False Color Caused By Color Separation Filters" (Issued on Nov. 27, 1990) a false color suppression circuit which generates two delayed signals to cover the front and rear edges of a chroma signal generated by processing the output signal of an image sensor with a color filter. Tusji also uses a circuit block to generate a third delayed signal to cover the interval between the two delayed signals. These delayed signals are then used to cancel the false color signals caused by high incident light. FIG. 2A shows the timing sequence of various signals including the original signal, the chrominance signal, the delay signals generated by combinations of various delay circuit block as disclosed by Tsuji, and then the suppressing signals formed by the use of all these signals.

Figure 2B:
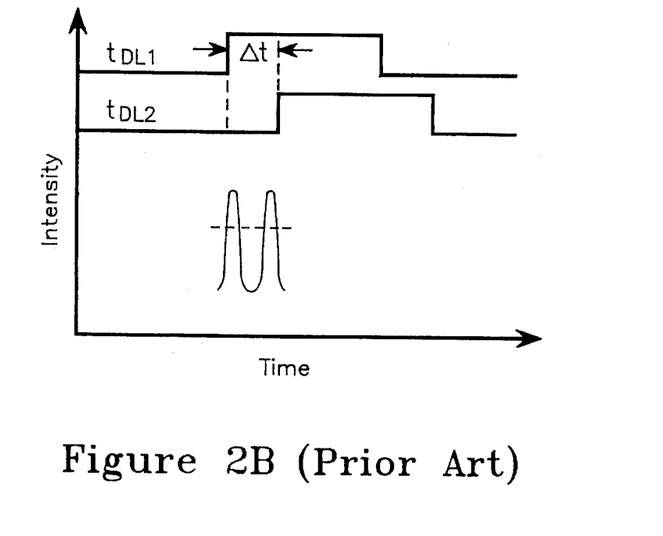

The technique disclosed by Tsuji is able to more precisely control the time-range over which the color suppression is to be performed. However, the lengths of these delay are fixed as part of the circuit design. The time duration of a high intensity may vary dynamically from time to time and the rising and falling rates of the signal intensity may also change and become unpredictable. The method as disclosed by Tsuji is still not able to dynamically respond to these real time variations. The errors caused by over-suppression or under suppression may still occur when the dynamic variations of the high intensity image signals exceed the design ranges of these fixed length delays. One specific example is a situation when the variations of the high intensity signal have several fluctuations within a fixed delay cycle difference as that shown in FIG. 2B. A portion of the color is erroneously suppressed due to the limitation that the delay circuit does not have the capability to dynamically respond to the changes of the signal variations.

Therefore, there is still a demand in the art of image sensing and display for a new method and data processing system which can accurately and dynamically monitoring the intensity of the image signals and cancelling the false colors such that the limitations and difficulties of the prior art may be resolved. Particularly, this processing system must have a method to reduce or eliminate the errors caused by under suppression or over suppression of the image data when a high intensity image signal is detected.

SUMMARY OF THE PRESENT INVENTION

It is therefore an object of the present invention to provide a false color suppression signal generating circuit to overcome the aforementioned difficulties encountered in the prior art.

Specifically, it is an object of the present invention to provide a false color suppression signal generating circuit wherein the false color suppression is more precisely executed by accurately detecting the false color effect by independently and simultaneously sensing both the luminance signal and the rising and falling sides of the edge signals.

Another object of the present invention is to provide a false color suppression signal generating circuit wherein the false color suppression is performed taking into consideration of the vertical and horizontal edges of the high intensity image areas..

Another object of the present invention is to provide a false color suppression signal generating circuit wherein the false color suppression is performed in by Sensing the digital signal variations on a real time basis whereby the false color cancellation can be dynamically and responsively executed.

Briefly, in a preferred embodiment, the present invention comprises an image data processing system which includes an image data receiving means, e.g., a CCD module, for receiving and converting a plurality of image data into electrical signals. The image data processing system further includes a color processing subsystem which includes the color separation unit, the RGB generation unit, the white balance control unit, the gamma correction unit, and the color space converter, for processing the electrical signals for generating color display output representing the color space of the image data. The image data processing system further includes a luminance processing means which includes two 1-H line memory units, the low pass filter, the edge enhancement unit, the summing circuit and the gamma correction unit, for filtering and processing the electrical signals for generating luminance output representing the luminance field of the image data. The luminance processing means further including a false color suppression signal generating means for generating a false color suppression signal by using a brightness threshold means and an edge threshold means which employs a high edge threshold and low edge threshold. The luminance processing means further provides the false color suppression signal to the color processing means, e.g. to the color space converter, for suppressing the display of the false color.

It is an advantage of the present invention that it provides a false color suppression signal generating circuit wherein the false color suppression is more precisely executed by accurately detecting the false color effect by independently and simultaneously sensing both the luminance signal and the rising and falling sides of the edge signals.

Another advantage of the present invention is that it provides a false color suppression signal generating circuit wherein the false color suppression is performed taking into consideration of the vertical and horizontal edges of the high intensity image areas..

Another advantage of the present invention is that it provides a false color suppression signal generating circuit wherein the false color suppression is performed in by sensing the digital signal variations on a real time basis whereby the false color cancellation can be dynamically and responsively executed.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 3:
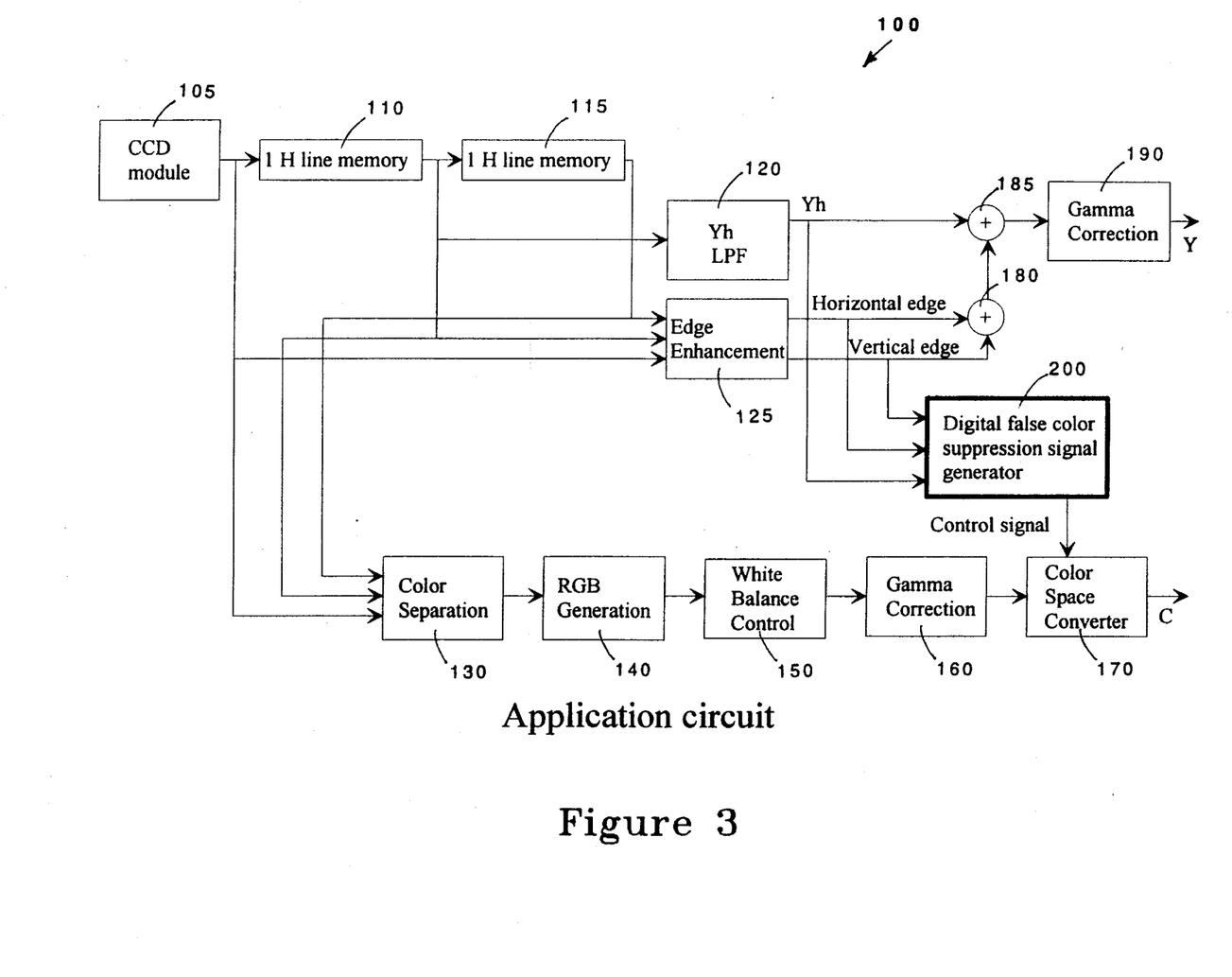
FIG. 3 is a functional block diagram for an image data processing system of the present invention.

FIG. 3 is a functional block diagram of a image data processing system 100 according to the present invention. The image data is received by the image data processing system 100 from a CCD module 105. The image data inputted from the CCD module 105 is first converted to a digital data by an analog to digital (A/D) converter included therein and then transmitted to a first one-horizontal line memory 110 wherein the image data is delayed for a duration of one horizontal line data reception time, i.e., 1-H delay. The 1-H delay image data is then transmitted to a second one-horizontal line memory 115 wherein the image data is further delayed for a duration of another horizontal line data reception time, i.e., a total of 2-H delay. The 1-H delay image data are then transmitted to a $Y_h$ low pass filter (LPF) 120 to generate a horizontal luminance signal $Y_h$. In the meantime, the image data input from the CCD module 105, the signals from the first 1-H line memory 110 and the signals from the second 1-H line memory 115 are also transmitted to an edge enhancement unit 125 and a color separation unit 130. The signals generated by the color separation unit 130 are then further processed by an RGB generation unit 140, a white balance control unit 150, a gamma correction unit 160 and a color space converter 170 to generate the final color signal output C. Since the system configuration and the functions performed by these processing units including the RGB generation unit 140, the white balance control unit 150, the gamma correction unit 160 and the color space converter 170 are well known in the art, no further detail description will be provided in this patent application.

Figure 4:
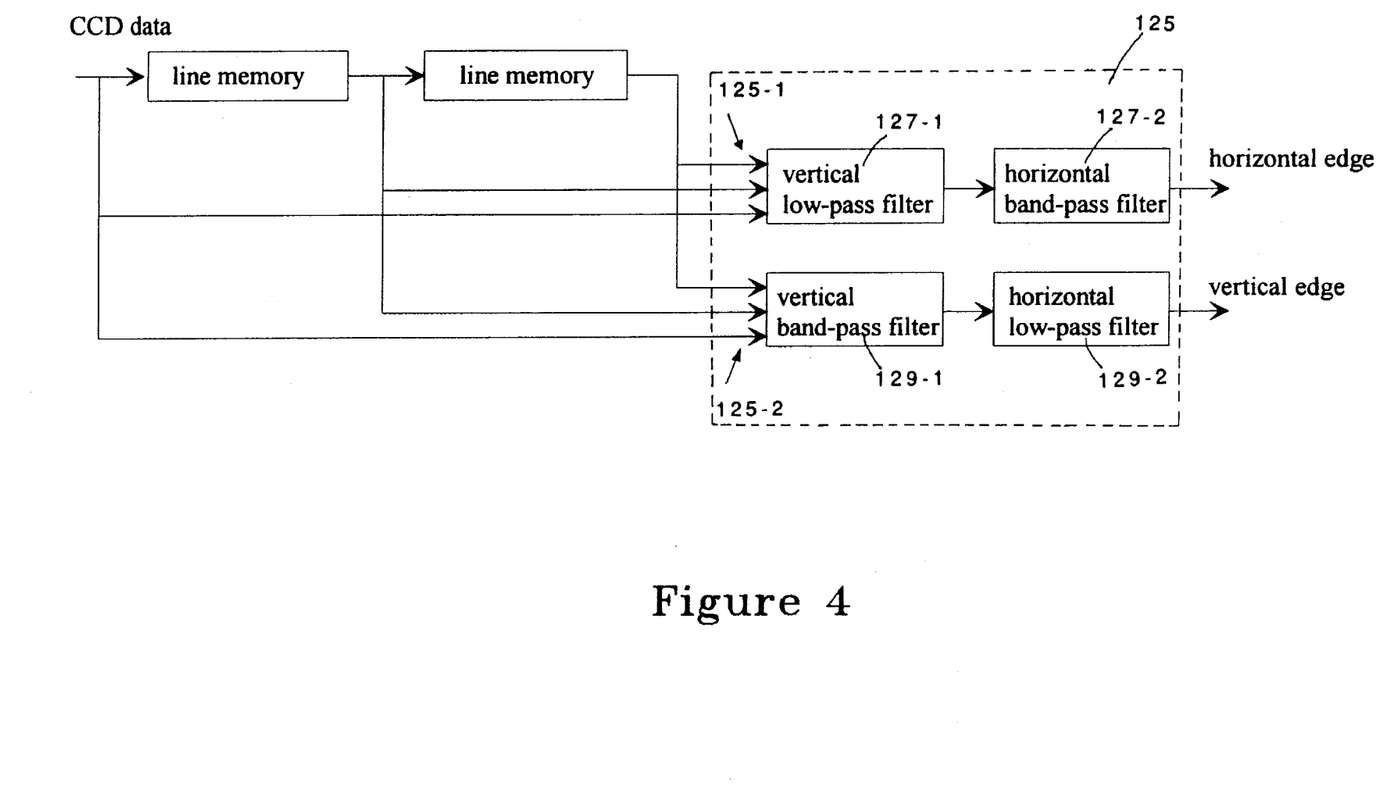
FIG. 4 is a functional block diagram for an edge enhancement unit implemented in the image data processing system of FIG. 3.
Figure 5A:
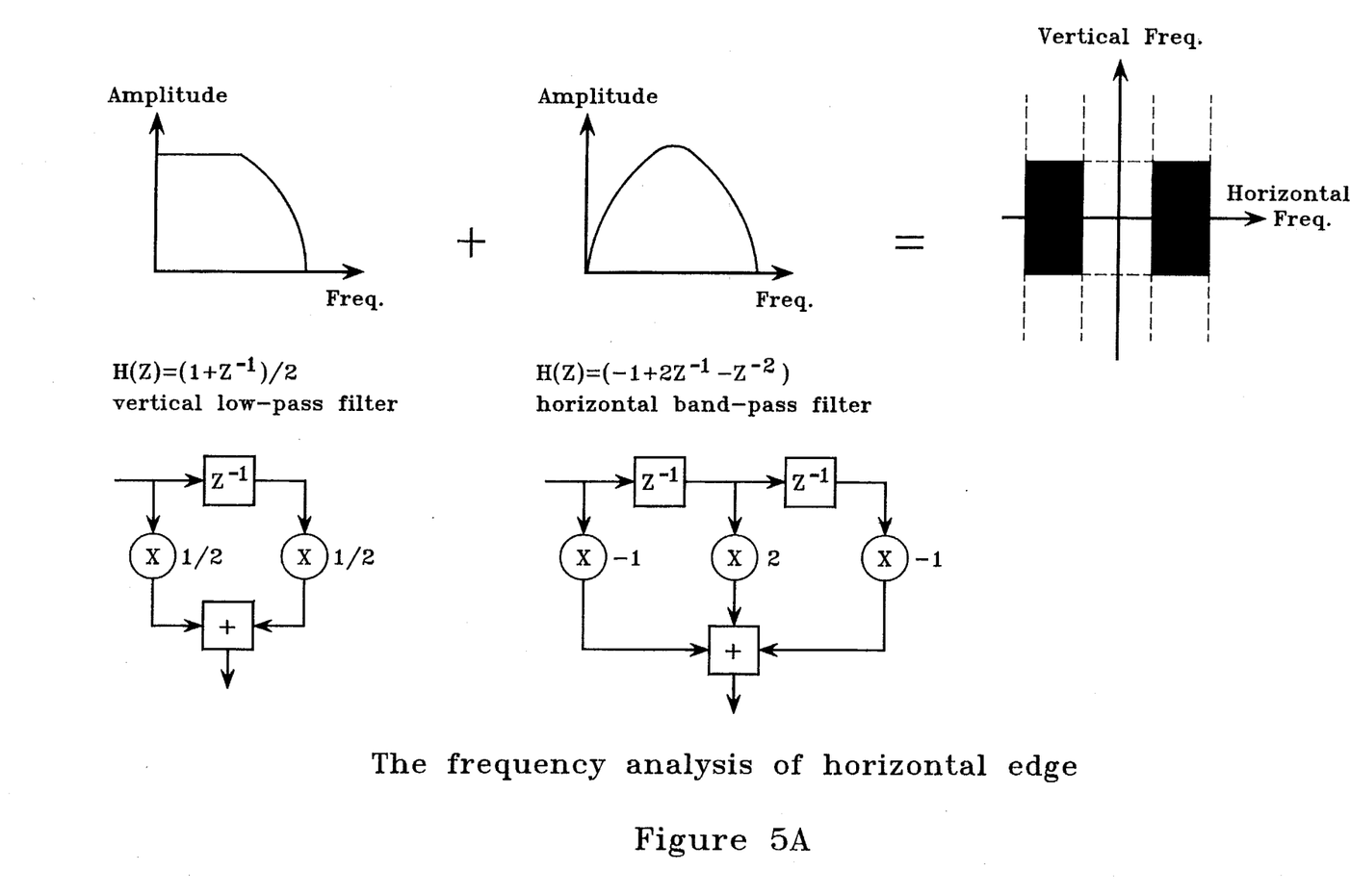
FIGS. 5A and 5B are the functional block diagrams and the filtering characteristics of different kinds of filters included in the edge enhancement unit of FIG. 4.
Figure 5B:
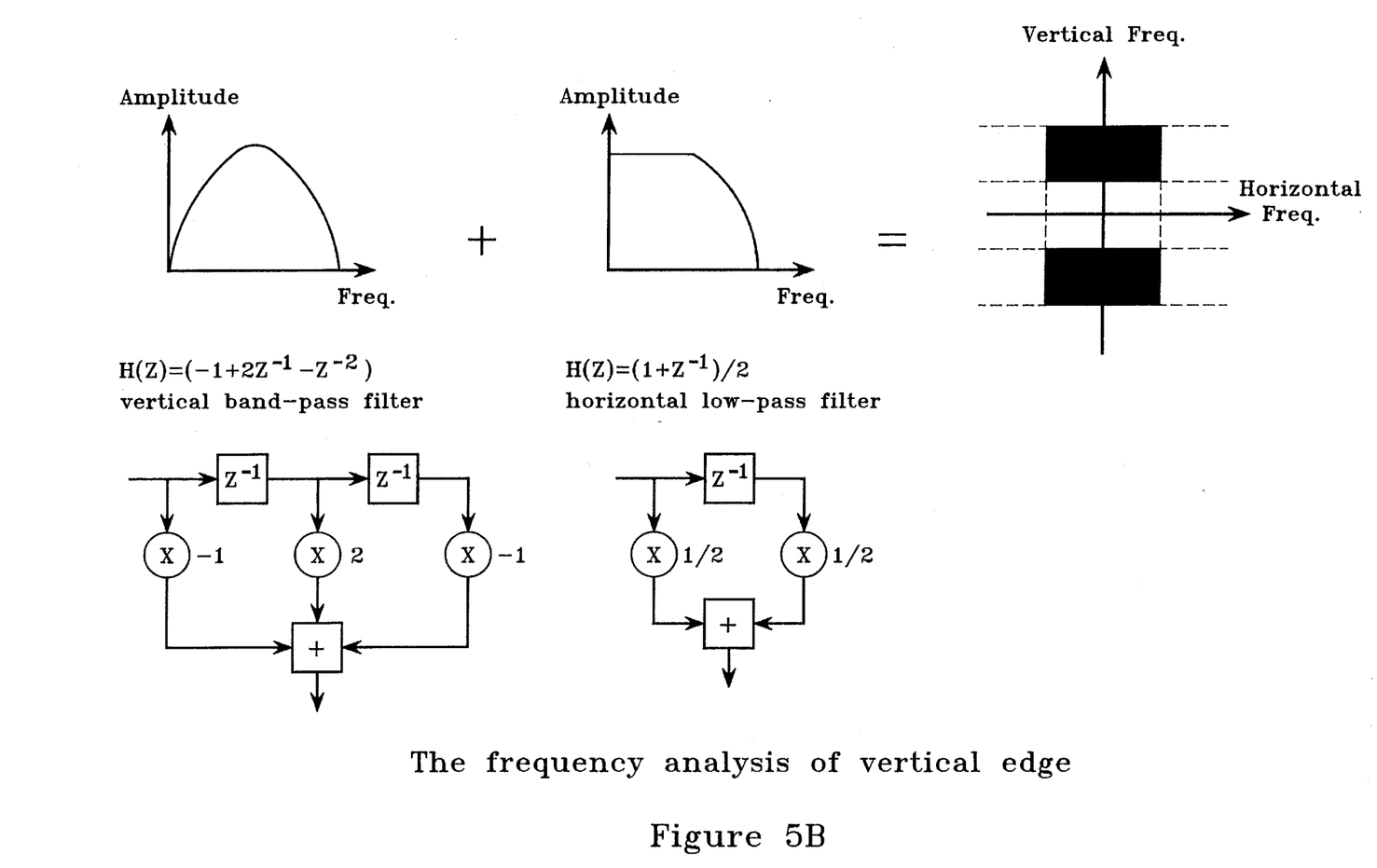

FIG. 4 is a functional block diagram of the edge enhancement unit 125 which includes a horizontal edge branch 125-1 and vertical edge branch 125-2 wherein the horizontal edge branch 125-1 includes a vertical low-pass filter 127-1 and a horizontal band pass filter 127-2 to generate a horizontal edge signal. The vertical edge branch 125-2 includes a vertical band-pass filter 129-1 and a horizontal low-pass filter 129-2 to generate a vertical edge signal. FIGS. 5A and 5B illustrates the functions performed by the low-pass filters and the band-pass filters included in the edge enhancement unit 125. The vertical low-pass filter 127-1 and the vertical band-pass filter 129-1 each receives the image data input from the CCD module 105 and the processed signals from the first 1-H line memory 110 and the second 1-H line memory 115 to perform a vertical low-pass filtering function, i.e., $H(Z)=(\frac{1}{2})(1+Z^{-1})$, and a vertical band-pass filtering function, i.e., $H(Z)=(-1+2Z^{-1}-Z^{-2})$, as shown in FIG. 5A and 5B respectively. The signals generated by the vertical low-pass filter 127-1 and the vertical band-pass filter 129-1 are then further processed by a horizontal band-pass filter 127-2 which performs a $H(Z)=(-1+2Z^{-1}-Z^{-2})$ filtering function and a horizontal low-pass filter 129-2 which performs a $H(Z)=(1+Z^{-1})/2$ filtering function to generate a horizontal edge signal and vertical signal as shown in FIGS. 5A and 5B respectively.

Please refer to FIG. 3 again wherein the horizontal edge signal and the vertical edge signal generated by the edge enhancement unit 125 are processed by a first summing circuit 180 to generate an edge luminance signal which is further processed by a second summing circuit 185 to be combined with the horizontal luminance signal $Y_h$ generated from the $Y_h$ low-pass filter 120. The combined signal the total edge luminance signal which is generated from the second summing circuit 185 is further processed by a gamma correction unit 190 to generate an output luminance signal Y to be received by image display unit wherein the luminance signal Y is utilized together with the color signal C to generate the display color image.

In order to achieve the purpose of suppressing the display of false color, the horizontal luminance signal $Y_h$ and the horizontal and vertical edge signals are transmitted to a digital false color suppressing signal generator 200 to generate a false color control signal which is inputted to the color space converter 170 to control the performance of the color conversion such that the false color display can be suppressed.

Figure 6:
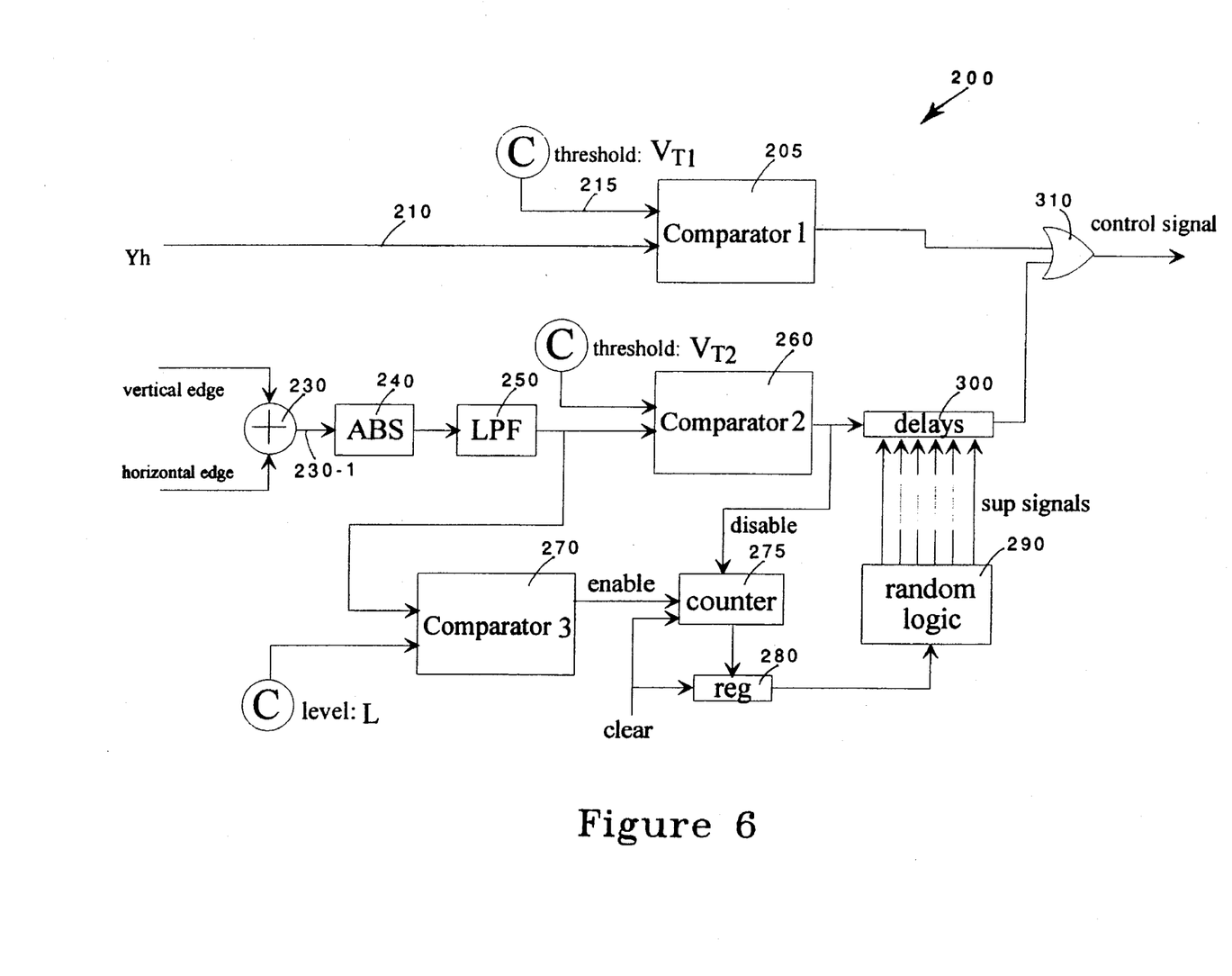
FIG. 6 is a functional block diagram for a false color suppression signal generator implemented in the image data processing system of FIG. 3.
Figure 7A:
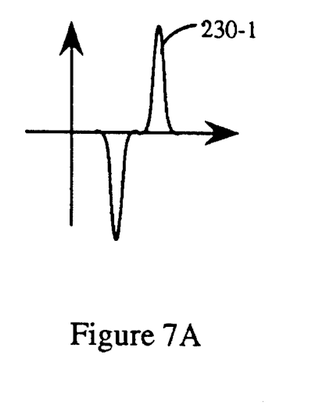
FIGS. 7A to 7D are the timing diagrams of the image signal at various stages of processes performed by the false color suppression signal generator of FIG. 6.
Figure 7B:
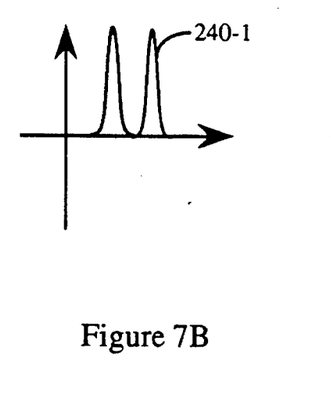
Figure 7C:
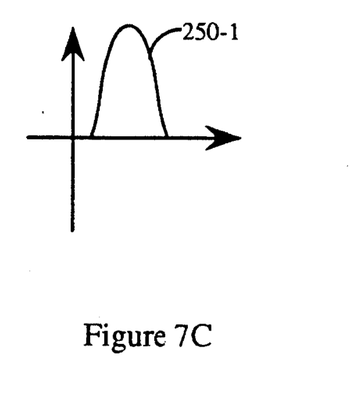

FIG. 6 shows a functional block diagram of the false color suppression signal generator 200 according to one of a preferred embodiments for the present invention. The function of false color suppression is accomplished by performing two parallel tasks simultaneously. The first task is performed by the use of a luminance threshold means which includes a first comparator 205 with two input ports. The first input port 210 of the comparator 205 receives the luminance data $Y_h$ from the $Y_h$ LPF 120 and the second input port 215 receives a luminance threshold $V_{T1}$. The first comparator 205 then compares the intensity of the luminance signal $Y_h$ to determine if the luminance signal $Y_h$ exceeds the luminance threshold $V_{T1}$. A luminance false color suppression signal is generated if the threshold is exceeded which will be used in combination with the output generated from the performance of the second task described below to suppress the display that pixel. The second task involves the processing of the pixel data along the edge of the high luminance area. Referring to FIGS. 7A to 7D together with FIG. 6 for the description of the processes performed in the edge pixel treatment for false color suppression. The vertical edge and the horizontal edge signals generated from the edge enhancement unit 125 are first summed up by a summing means 230. FIG. 7A shows a typical signal 230-1 generated from the summing circuit 230 wherein the signal intensity is presented as a function of time. The summed signal 230-1 from the summing means 230 is then processed by an absolute circuit 240 which converts the signal as that shown in FIG. 7A to a corresponding positive wave function 240-1 as that shown in FIG. 7B. The positive function 240-1 (see FIG. 7B) is then processed by a low-pass filter 260 to generate a low-pass filtered signal 260-1 as that shown in FIG. 7C.

The low-pass filtered signal 250-1 (see FIG. 7C) is first transmitted to a high threshold comparator 260 wherein the filtered signal 250-1 is compared with a high threshold $V_{T2}$. An 'suppression enable' signal is generated when the threshold $V_{T2}$ is exceeded. In addition to the comparison made in the high threshold comparator 260, the low-pass filtered signal 250-1 is also received into a low threshold comparator 270 wherein the signal 250-1 is compared to a low threshold L. If the signal 250-1 exceeds the low threshold L, i.e., starting from point 250-1-1 and ending at the point 250-1-2 or starting at the point 250-1-3 and ending at point 250-1-4, an enable signal is generated to start the counter 275. At the time when the signal 250-1 reaches the high threshold $V_{T2}$, i.e., starting at the point 250-1-2 and ending at the point 250-1-3, a disable signal is generated from the high threshold comparator 260 to stop the counter 275 and to load the number of pixels accumulated in the counter 275 to a register 280. Thus the number of the pixel from the time 250-1-1 to 250-1-2 is now loaded into the register 280. The number of pixels stored in the register 280 is then transmitted to a random logic 290 for a determination of the number of pixels for which the color signal is to be suppressed. At the time when the number of the pixels stored in the register 280 is transmitted to the random logic 290, a clear signal is initiated to simultaneously clear the counter 275 and the register 280 such that the counter 275 and the register 280 are ready for the processes to be performed for the next rising or falling edge as that shown in FIG. 7D.

Figure 7D:
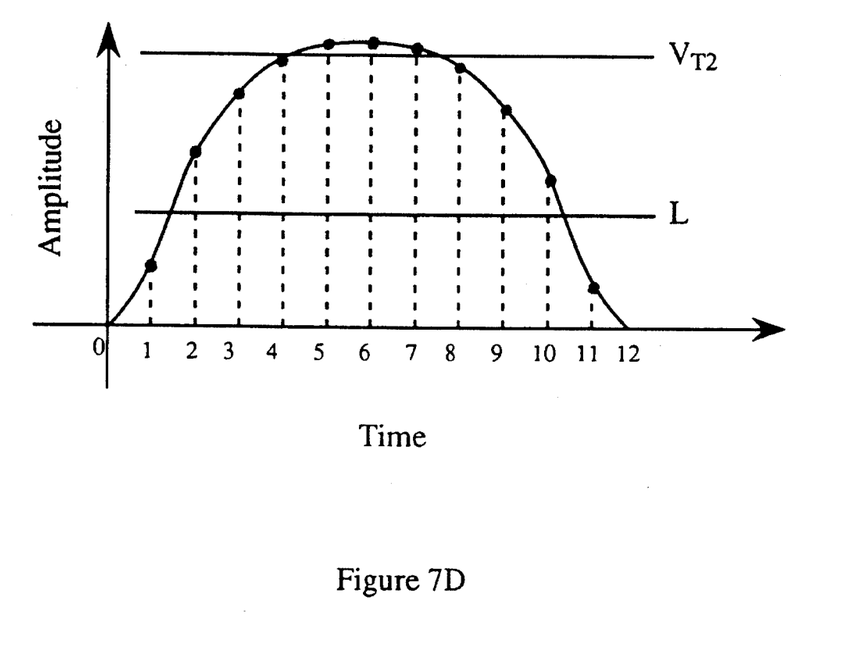

Referring to FIG. 7D and assuming that the delay circuit 300 is a five-bit flip-flop, when t=1, the pixel value is less than the low threshold L and less than the high threshold $V_{T2}$, the output of the second comparator 260 is zero, therefore the delay circuit 300 stores a bit pattern of 0- - -. (step 1) When t=2, the pixel value is higher than the low threshold L and lower than the high threshold $V_{T2}$, the counter 275 is enabled with a value of one and the output of the comparator 260 still generates an output value of zero thus the content of the delay circuit becomes 00- - - (step 2). When t=3, the situation is still the same as when t=2, the counter 275 has a value of two (incremental by one) and the delay circuit 300 now stores a bit-pattern of 000-- (step 3). When t=4, by the same reason as for t=3, the counter 275 has a value of three and the delay circuit 300 now stores a bit-pattern of 0000- (step 4). When t=5, the pixel value exceeds the high threshold $V_{T2}$, the counter 275 is now disabled and the value stored therein remains at a constant value which is three while the second comparator generates an output an output of one and thus the content of the delay circuit 300 is 10000 (step 5). When t=6, the pixel value still exceeds the high threshold $V_{T2}$, the counter 275 is still being disabled and the value stored therein remains at a constant value which is three while the second comparator 260 generates an output an output of one and thus the content of the delay circuit 300 is 11000 (step 6). The three zeros in the bit pattern 11000 stored in the delay circuit 300 thus represent the number of pixels which have a pixel value greater than the low threshold value L and greater than the high threshold $V_{T2}$. Also, the value of the counter 275 which is three is also down-loaded into the register 280 and processed by the random logic circuit 290 to generate a bit pattern of 00111. The bit pattern from the random logic 290, i.e., 00111, when transmitted to and received by the delay circuit 300, the delay circuit 300 with its D-type flip-flop set pins is set to become 11111. Then the counter 275 and the register 280 are cleared to become zero and ready for next rising or falling edge.

Continuing with the operations described above, when t=7, the pixel value is still greater than the high threshold $V_{T2}$, the value of the counter stays at zero, the second comparator 260 generates an output of one and the bit-pattern of the delay circuit 300 remains to be 11111 (step 7). At t=8, the pixel value is lower than the high threshold $V_{T2}$ and greater than the lower threshold L, the counter is enabled and start to count from a value of one, and the bit-pattern of the delay circuit becomes 01111 as the second comparator 260 generates a bit of zero (step 8). The process continues as described above for step 3 to step 6. By the use of above processes, the false color suppression signal generator 200 thus generates a combined edge suppression signal by combining the suppression enable signal from the high threshold comparator 260 and the suppression signal generated from the random logic 290. This combined edge suppression signal generated by the delay circuit 300 is to be further combined with the luminance suppression signal from first comparator 205 by the use of an OR circuit 310 which generates a control signal to be received by the color space converter 170 for suppressing the display of the false color.

According to the above description, this invention discloses an image data processing system 100 which includes an image data receiving means, e.g., a CCD module 105, for receiving and converting a plurality of image data into digital electrical signals. The image data processing system 100 further includes a color processing subsystem which includes the color separation unit 130, the RGB generation unit 140, the white balance control unit 150, the gamma correction unit 160, and the color space converter 170, for processing the electrical signals for generating color display output representing the color space of the image data. The image data processing system further includes a luminance processing means which includes two 1-H line memory units 110 and 115, the low pass filter 120, the edge enhancement unit 125, the summing circuit 185 and the gamma correction unit 190, for filtering and processing the electrical signals for generating luminance output representing the luminance field of the image data. The luminance processing means further including a false color suppression signal generating means 200 for generating a false color suppression signal by using a brightness threshold means and an edge threshold means which employs a high edge threshold and low edge threshold for generating an edge color suppression signal. The luminance processing means further provides the false color suppression signal to the color processing means, e.g. to the color space converter 170, for suppressing the display of the false color.

In another preferred embodiment, in the aforementioned image data processing system 100, the brightness threshold means further includes a comparator 205 for comparing the luminance output to a brightness threshold $V_{T1}$ for generating a false color suppression enable signal when the luminance output exceeds the brightness threshold $V_{T1}$;. The edge threshold means further includes an edge enhancement processing means 125 for generating a horizontal edge signal and a vertical edge signal. The edge threshold means further includes an edge signal processing means including a summing circuit 230 for adding the vertical edge signal and the horizontal edge signal for generating a Summed edge signal. The edge signal processing means further includes an absolute-value processor 240 for generating an absolute value edge signal for the summed edge signal. The edge threshold means further includes a high edge threshold means and a low edge threshold means wherein the high edge threshold means comparing the absolute value edge signal to the high edge threshold $V_{T2}$ and the low edge threshold means comparing the absolute value edge signal to the low edge threshold L whereby the high edge threshold means cooperating with the low edge threshold means for generating the edge color suppression signal for suppressing the false color between the low edge threshold and high edge threshold.

In another preferred embodiment, in the aforementioned image data processing system 100, the high edge threshold means further includes a second comparator 260 for comparing the absolute value edge signal to the high edge threshold $V_{T2}$ for generating a counter disable signal when the absolute value edge signal exceeds the high edge threshold. The low edge threshold means further includes a third comparator 270 for comparing the absolute value edge signal to the low edge threshold L for generating a counter enable signal when the absolute value edge signal exceeds the low threshold edge signal L. The edge threshold means further includes an edge pixel counter 275, a pixel counter register 280, a random logic means 290 and a delay circuit 300 wherein the edge pixel counter 275 receiving the counter enable signal from the third comparator 270 to start counting the pixel number of the electrical image signals. The pixel counter 275 further receiving the counter disable signal from the second comparator 260 for stopping counting the pixel number and then loading the pixel number to the register 280. the pixel number loaded in the register 280 being further transmitted to and processed by the random logic 290. The delay circuit 300 receiving the output from the random logic 290 and the second comparator 260 for generating an appropriate delay to combine the output from the second comparator 260 and the random logic 290 for generating the edge color suppression signal.

This invention also discloses a method for processing a plurality of image input data for suppressing false color. The method includes the following steps (a) receiving and converting the plurality of image input data into electrical signals; (b) processing the electrical signals for generating color display output representing the color space of the image input data; (c) filtering and processing the electrical signals for generating luminance output representing the luminance field of the image data; (d) generating a false color suppression signal by using a brightness threshold means for generating a brightness color suppression signal and an edge threshold means employing a high edge threshold and low edge threshold for generating an edge color suppression signal; and (e) processing the brightness color suppression signal and the edge color suppression signal for providing the false color suppression signal to the color processing means for suppressing the display of the false color.

Figure 8:
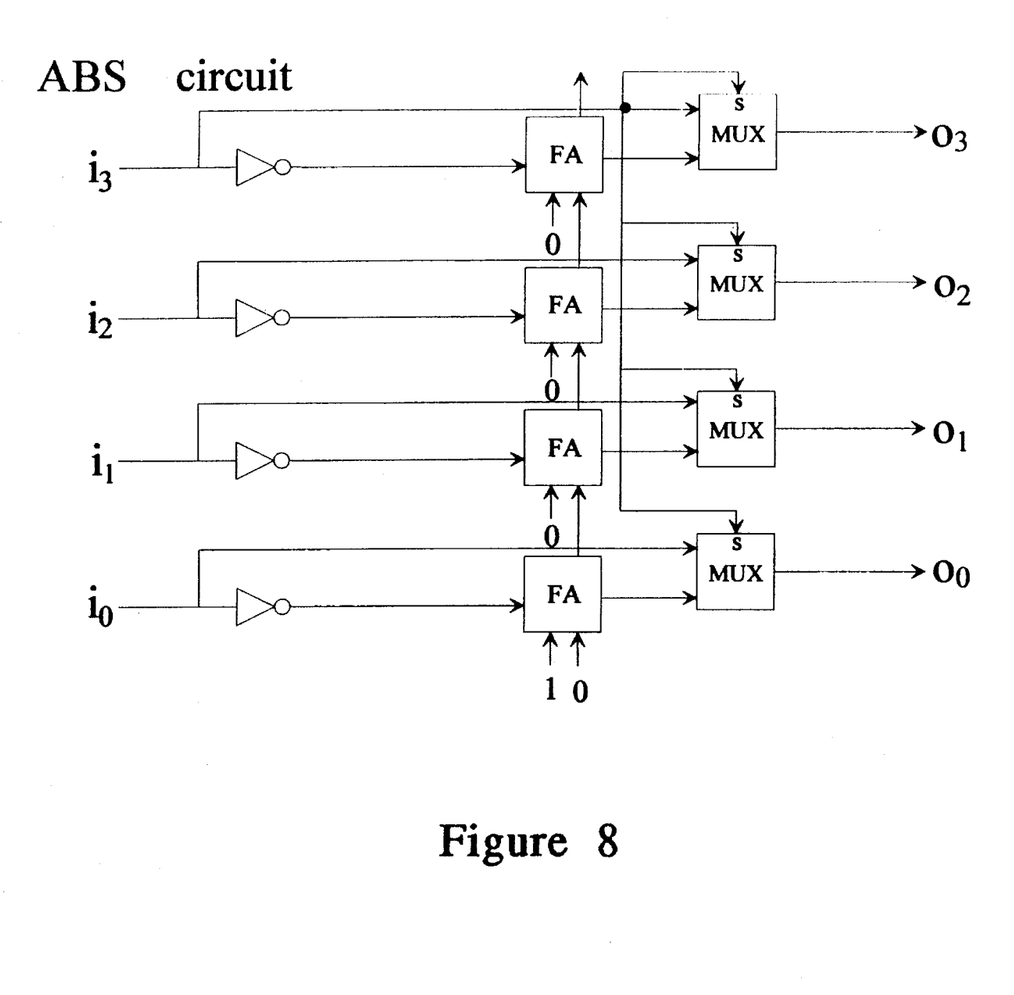
FIG. 8 is a circuit diagram of an ABS circuit included in the false color suppression signal generator of FIG. 6.
Figure 9:
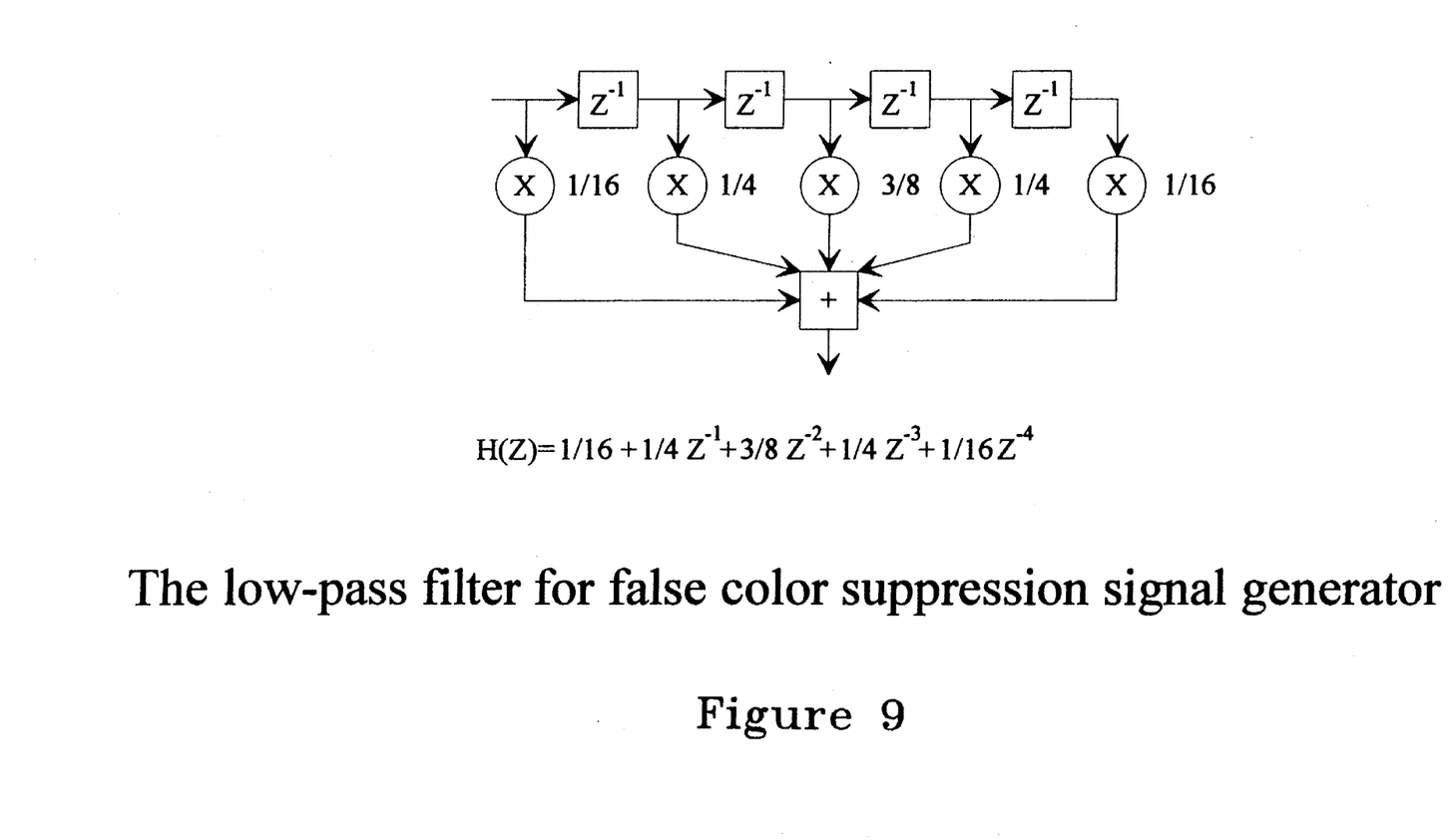
FIG. 9 is a functional block diagram of a low-pass filter for the false color suppression signal generator of FIG. 6.
Figure 10:
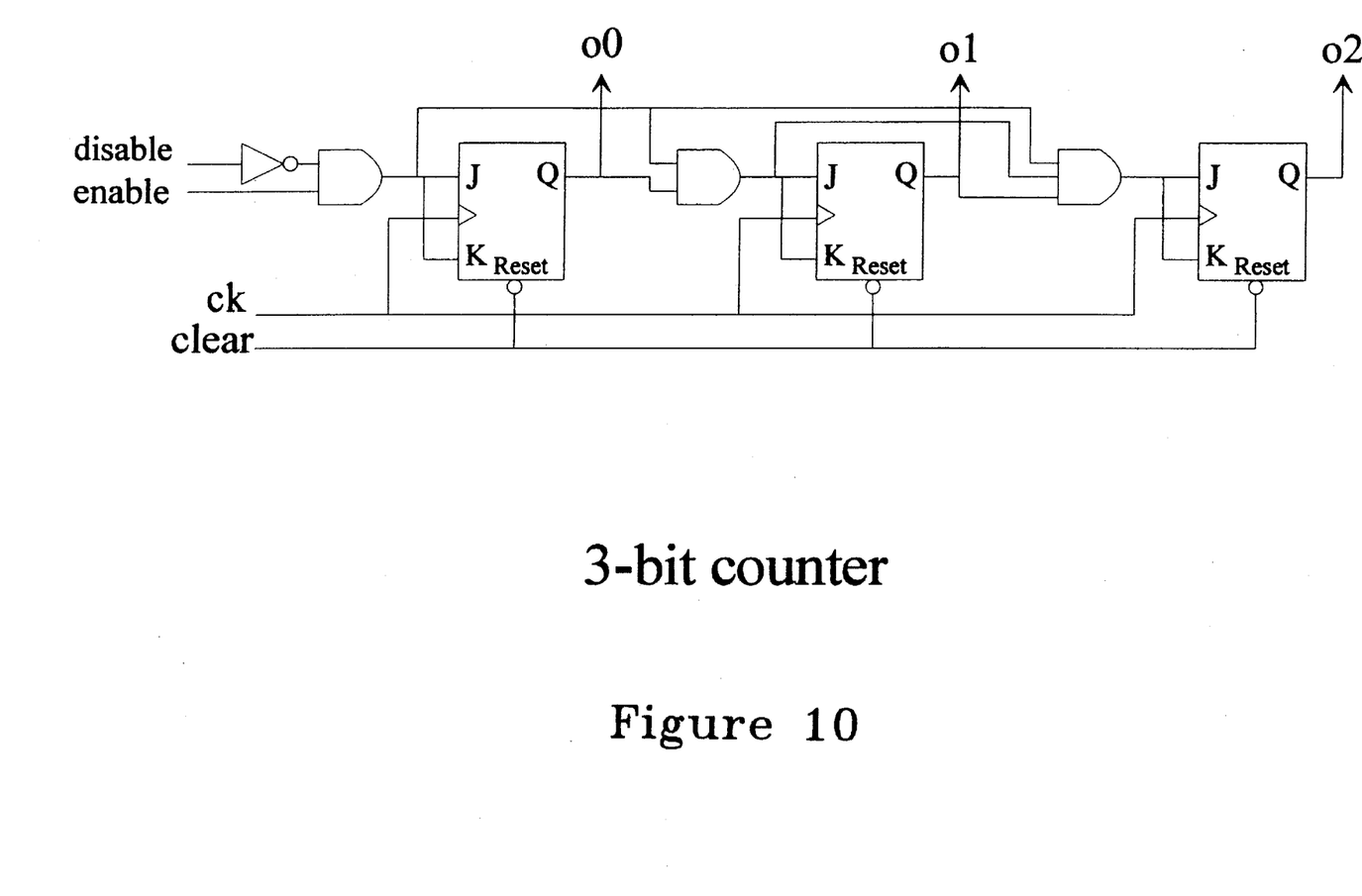
FIG. 10 is a logic circuit diagram of a three-bit counter for the false color suppression signal generator of FIG. 6.
Figure 11:
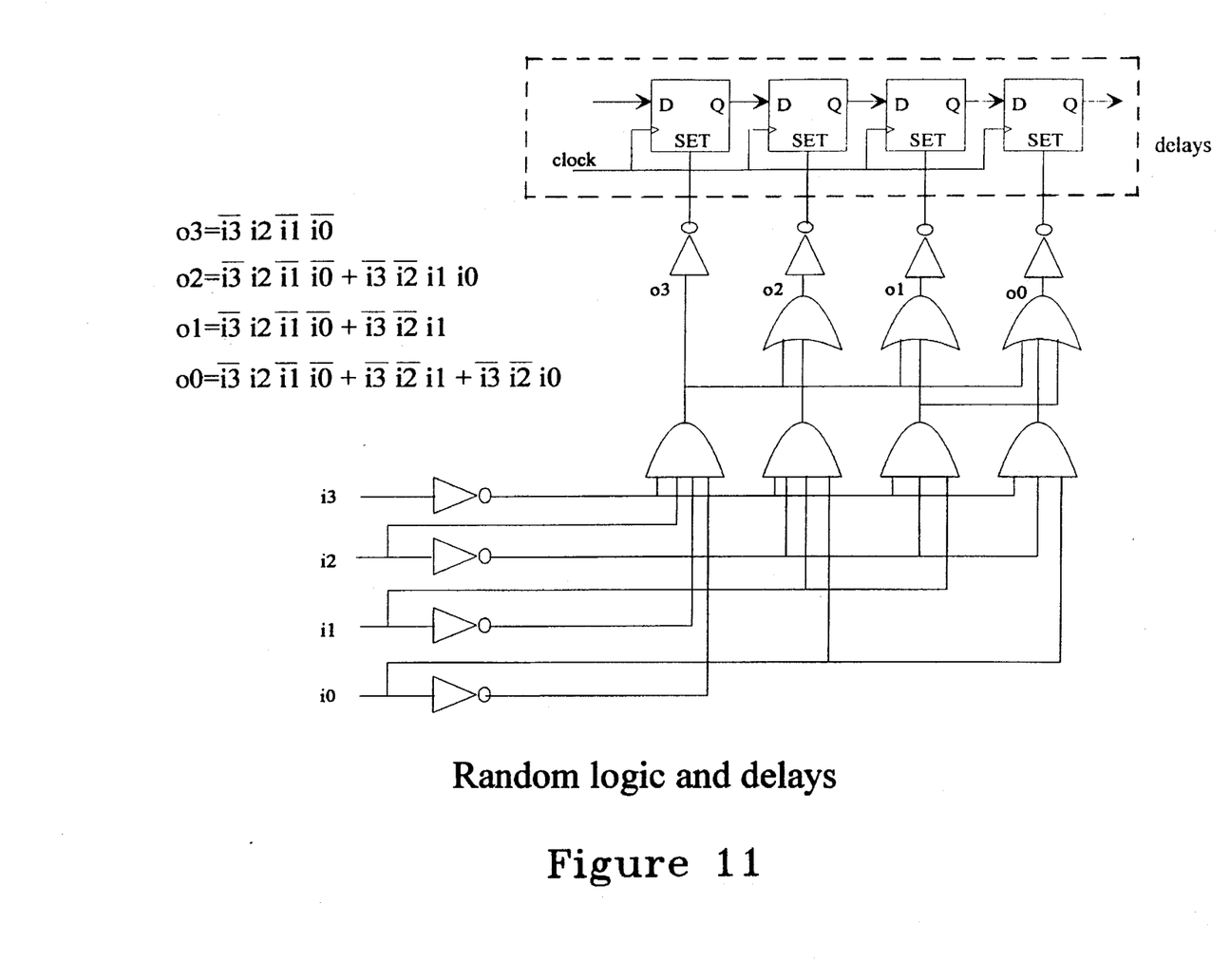
FIG. 11 is a logic circuit diagram of a random logic and delay circuit for the false color suppression signal generator of FIG. 6.

FIG. 8 is a circuit diagram of an ABS circuit 240, FIG. 9 is a functional block diagram of a low-pass filter 250, FIG. 10 is a logic circuit diagram of a three-bit counter 275, and FIG. 11 is a logic circuit diagram of a random logic 290 and delay circuit 290 for the false color suppression signal generator 200 as shown in FIG. 6. These circuit components employed by the false color suppression signal generator 200 are well known in the art and commonly available commercially in the market place. The drawings of these components are included here for showing one among many preferred embodiments for manufacturing this false color suppression signal generator 200. The working principles and circuit structures of these circuit components are common knowledge among those who are skilled in the art, therefore, no detail description of these components will be provided in this application.

The present invention thus provides a data processing system and method for false color suppression which is able to overcome the difficulties encountered in the prior art. Specifically, it provides a false color suppression signal generating circuit wherein the task of false color suppression is more precisely executed because both the intensity of the luminance signal and the rising and falling sides of the edge signals are independently and simultaneously monitored in a dynamic fashion. The false color suppression signal generating circuit further takes into consideration the effects of the vertical and horizontal edges of the high intensity image areas by the use of an edge enhancement processing unit and an edge threshold means. By utilizing the false color suppression signal generating circuit of the present invention, the task of the false color suppression is performed on a real time basis and the false color cancellation can be dynamically and responsively executed.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An image data processing system comprising:

an image data receiving means for receiving and converting a plurality of image data into electrical signals;

a color processing subsystem for processing said electrical signals for generating color display output representing a color space of said image data;

a luminance processing means for filtering and processing said electrical signals for generating luminance output representing a luminance field of said image data;

said luminance processing means further including a false color suppression signal generating means for generating a false color suppression signal, said false color suppression signal generating means including a brightness threshold means for generating a brightness color suppression signal, said false color suppression signal generating means further including an edge threshold means for generating an edge color suppression signal by employing a high edge threshold and low edge threshold; and said luminance processing means further including an OR circuit for receiving and processing said brightness color suppression signal and said edge color suppression signal for providing said false color suppression signal to said color processing means for suppressing the display of said false color.

2. The image data processing system of claim 1 wherein:

said edge threshold means further includes an edge enhancement processing means for generating a horizontal edge signal and a vertical edge signal.

3. The image data processing system of claim 2 wherein:

said brightness threshold means further includes a comparator for comparing said luminance output to a brightness threshold for generating a false color suppression enable signal when said luminance output exceeds said brightness threshold.

4. The image data processing system of claim 3 wherein:

said edge threshold means further includes an edge signal processing means including a summing circuit for adding said vertical edge signal and said horizontal edge signal for generating a summed edge signal, said edge signal processing means further includes an absolute-value processor for generating an absolute value edge signal for said summed edge signal;

said edge threshold means further includes a high edge threshold means and a low edge threshold means wherein said high edge threshold means comparing said absolute value edge signal to said high edge threshold and said low edge threshold means comparing said absolute value edge signal to said low edge threshold whereby said high edge threshold means cooperating with said low edge threshold means for generating said edge color suppression signal for suppressing said false color between said low edge threshold and high edge threshold.

5. The image data processing system of claim 4 wherein:

said high edge threshold means further includes a second comparator for comparing said absolute value edge signal to said high edge threshold for generating a counter disable signal when said absolute value edge signal exceeds said high edge threshold; and said low edge threshold means further includes a third comparator for comparing said absolute value edge signal to said low edge threshold for generating a counter enable signal when said absolute value edge signal exceeds said low threshold edge signal;

said edge threshold means further includes an edge pixel counter, a pixel counter register, a random logic means and a delay circuit wherein said edge pixel counter receiving said counter enable signal from said third comparator to start counting the pixel number of said electrical image signals;

said pixel counter further receiving said counter disable signal from said second comparator for stopping counting said pixel number and then loading said pixel number to said register;

said pixel number loaded in said register being further transmitted to and processed by said random logic; and said delay circuit receiving the output from said random logic and said second comparator for generating an appropriate delay to combine the output from said second comparator and said random logic for generating said edge color suppression signal.

6. An image data processing system comprising:

an image data receiving means for receiving and converting a plurality of image data into electrical signals;

a color processing subsystem for processing said electrical signals for generating color display output representing a color space of said image data;

a luminance processing means for filtering and processing said electrical signals for generating luminance output representing a luminance field of said image data;

said luminance processing means further including a false color suppression signal generating means for generating a false color suppression signal, said false color suppression signal generating means including a brightness threshold means for generating a brightness color suppression signal, said false color suppression signal generating means further including an edge threshold means for generating an edge color suppression signal by employing a high edge threshold and low edge threshold;

said brightness threshold means further includes a comparator for comparing said luminance output to a brightness threshold for generating a false color suppression enable signal when said luminance output exceeds said brightness threshold;

said edge threshold means further includes an edge enhancement processing means for generating a horizontal edge signal and a vertical edge signal;

said edge threshold means further includes an edge signal processing means including a summing circuit for adding said vertical edge signal and said horizontal edge signal for generating a summed edge signal, said edge signal processing means further includes an absolute-value processor for generating an absolute value edge signal for said summed edge signal;

said edge threshold means further includes a high edge threshold means and a low edge threshold means wherein said high edge threshold means comparing said absolute value edge signal to said high edge threshold and said low edge threshold means comparing said absolute value edge signal to said low edge threshold whereby said high edge threshold means cooperating with said low edge threshold means for generating said edge color suppression signal for suppressing said false color between said low edge threshold and high edge threshold; and said luminance processing means further including an OR circuit for receiving and processing said brightness color suppression signal and said edge color suppression signal for providing said false color suppression signal to said color processing means for suppressing the display of said false color.

7. A false color suppression processing unit adaptable to an image data processing and display system for receiving a luminance signal therefrom wherein said processing unit comprising:

a brightness threshold means for generating a brightness color suppression signal and an edge threshold means employing a high edge threshold and low edge threshold for generating an edge color suppression signal; and a combining color suppression processing means including an OR circuit for performing an OR operation on said brightness color suppression signal and said edge color suppression signal for providing an output of a false color suppression signal.

8. The false color suppression processing unit of claim 7 wherein:

said brightness threshold means including a comparator for comparing said luminance signal to a brightness threshold for generating a false color suppression enable signal when said luminance output exceeds said brightness threshold;

said edge threshold means further includes an edge enhancement processing means for generating a horizontal edge signal and a vertical edge signal;

said edge threshold means further includes an edge signal processing means including a summing circuit for adding said vertical edge signal and said horizontal edge signal for generating a summed edge signal, said edge signal processing means further includes an absolute-value processor for generating an absolute value edge signal for said summed edge signal; and said edge threshold means further includes a high edge threshold means and a low edge threshold means wherein said high edge threshold means comparing said absolute value edge signal to said high edge threshold and said low edge threshold means comparing said absolute value edge signal to said low edge threshold whereby said high edge threshold means cooperating with said low edge threshold means for generating said edge color suppression signal for suppressing said false color between said low edge threshold and high edge threshold.

9. The false color suppression processing unit of claim 8 wherein:

said high edge threshold means further includes a second comparator for comparing said absolute value edge signal to said high edge threshold for generating a counter disable signal when said absolute value edge signal exceeds said high edge threshold; and said low edge threshold means further includes a third comparator for comparing said absolute value edge signal to said low edge threshold for generating a counter enable signal when said absolute value edge signal exceeds said low threshold edge signal;

said edge threshold means further includes an edge pixel counter, a pixel counter register, a random logic means and a delay circuit wherein said edge pixel counter receiving said counter enable signal from said third comparator to start counting the pixel number of said electrical image signals;

said pixel counter further receiving said counter disable signal from said second comparator for stopping counting said pixel number and then loading said pixel number to said register;

said pixel number loaded in said register being further transmitted to and processed by said random logic; and said delay circuit receiving the output from said random logic and said second comparator for generating an appropriate delay to combine the output from said second comparator and said random logic for generating said edge color suppression signal.

10. A method for processing a plurality of image input data for suppressing false color comprising the steps of:

(a) receiving and converting said plurality of image input data into electrical signals;

(b) processing said electrical signals for generating color display output representing a color space of said image input data;

(c) filtering and processing said electrical signals for generating luminance output representing a luminance field of said image data;

(d) generating a brightness color suppression signal by using a brightness threshold means and an edge color suppression signal by using an edge threshold means which employing a high edge threshold and low edge threshold; and (e) performing an OR operation on said brightness color suppression signal and said edge color suppression signal by employing an OR circuit for generating a false color suppression signal for suppressing said false color.

* * * * *